(12) United States Patent
Kato

(10) Patent No.: US 10,791,236 B2
(45) Date of Patent: Sep. 29, 2020

(54) IMAGE FORMING APPARATUS AND DISPLAY APPARATUS

(71) Applicant: Kyocera Document Solutions Inc., Osaka (JP)

(72) Inventor: Yusuke Kato, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 16/393,980

(22) Filed: Apr. 25, 2019

(65) Prior Publication Data
US 2019/0335053 A1    Oct. 31, 2019

(30) Foreign Application Priority Data

Apr. 27, 2018  (JP) ................. 2018-087177

(51) Int. Cl.
*H04N 1/00*    (2006.01)
*H04N 1/60*    (2006.01)

(52) U.S. Cl.
CPC ....... *H04N 1/00978* (2013.01); *H04N 1/6008* (2013.01); *H04N 1/6091* (2013.01)

(58) Field of Classification Search
None
See application file for complete search history.

(56) References Cited

U.S. PATENT DOCUMENTS

| | | | | |
|---|---|---|---|---|
| 5,331,433 A | * | 7/1994 | Sato | H04N 1/40056 358/461 |
| 5,609,978 A | * | 3/1997 | Giorgianni | G03C 7/3041 358/505 |
| 6,366,270 B1 | * | 4/2002 | Evanicky | G02B 6/0068 345/589 |
| 6,373,531 B1 | * | 4/2002 | Hidaka | G01J 1/4204 348/602 |
| 6,414,756 B1 | * | 7/2002 | Tsukada | H04N 1/6052 358/1.9 |
| 2002/0036696 A1 | * | 3/2002 | Takemoto | H04N 1/60 348/211.6 |
| 2003/0090750 A1 | * | 5/2003 | Takahashi | H04N 1/6027 358/516 |
| 2005/0014079 A1 | * | 1/2005 | Itakura | G03G 9/0821 430/45.4 |
| 2007/0043527 A1 | * | 2/2007 | Quan | G06K 9/4652 702/104 |
| 2008/0165815 A1 | * | 7/2008 | Kamijima | H01S 5/14 372/34 |
| 2010/0091039 A1 | * | 4/2010 | Marcu | G09G 5/06 345/690 |
| 2010/0277410 A1 | * | 11/2010 | You | G09G 3/3413 345/102 |

(Continued)

FOREIGN PATENT DOCUMENTS

JP    2012-048966 A    3/2012

*Primary Examiner* — Anh-Vinh T Nguyen
(74) *Attorney, Agent, or Firm* — James Judge

(57) ABSTRACT

An image forming apparatus includes an image forming unit, a temperature input unit, and an image processing unit. The image forming unit forms an image on a recording sheet. The temperature input unit receives an input of an environmental temperature. The image processing unit performs a preliminarily set process on the image based on the input environmental temperature. The process changes in accordance with the environmental temperature.

4 Claims, 7 Drawing Sheets

(56) References Cited

U.S. PATENT DOCUMENTS

| | | | | |
|---|---|---|---|---|
| 2011/0032275 | A1* | 2/2011 | Marcu | G09G 3/2003 345/690 |
| 2014/0055481 | A1* | 2/2014 | Gao | G09G 5/02 345/589 |
| 2014/0293091 | A1* | 10/2014 | Rhoads | G01J 3/2823 348/234 |
| 2015/0326842 | A1* | 11/2015 | Huai | G08B 25/006 348/223.1 |
| 2015/0346028 | A1* | 12/2015 | Furuta | G01J 3/502 356/408 |
| 2016/0187199 | A1* | 6/2016 | Brunk | G06K 9/2036 348/89 |
| 2019/0172415 | A1* | 6/2019 | Davis | G09G 3/2003 |
| 2019/0301941 | A1* | 10/2019 | Kawabata | H04N 1/46 |
| 2020/0020011 | A1* | 1/2020 | Harvill | G06K 9/4652 |

\* cited by examiner

IMAGE FORMING APPARATUS AND DISPLAY APPARATUS

INCORPORATION BY REFERENCE

This application is based upon, and claims the benefit of priority from, corresponding Japanese Patent Application No. 2018-087177 filed in the Japan Patent Office on Apr. 27, 2018, the entire contents of which are incorporated herein by reference.

BACKGROUND

Unless otherwise indicated herein, the description in this section is not prior art to the claims in this application and is not admitted to be prior art by inclusion in this section.

There has been proposed a technique where a color temperature of an illumination device is controlled in accordance with a temperature of an outside air to perform a color rendition for cooling when it is hot and perform a color rendition for warming when it is cold. For example, the above-described illumination device includes two LEDs having different color temperatures, a lighting output control circuit that controls the color temperatures of the two LEDs, a reference temperature storage unit that stores a reference temperature, and an outside air temperature detection element that detects an outside air temperature. The lighting output control circuit calculates a temperature difference between the detected outside air temperature and the reference temperature, and controls the color temperatures of the two LEDs based on this temperature difference. Then, the color temperature of the illumination device is controlled in accordance with the outside air temperature to perform the color rendition for cooling when it is hot and perform the color rendition for warming when it is cold.

SUMMARY

An image forming apparatus according to one aspect of the disclosure includes an image forming unit, a temperature input unit, and an image processing unit. The image forming unit forms an image on a recording sheet. The temperature input unit receives an input of an environmental temperature. The image processing unit performs a preliminarily set process on the image based on the input environmental temperature. The process changes in accordance with the environmental temperature.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
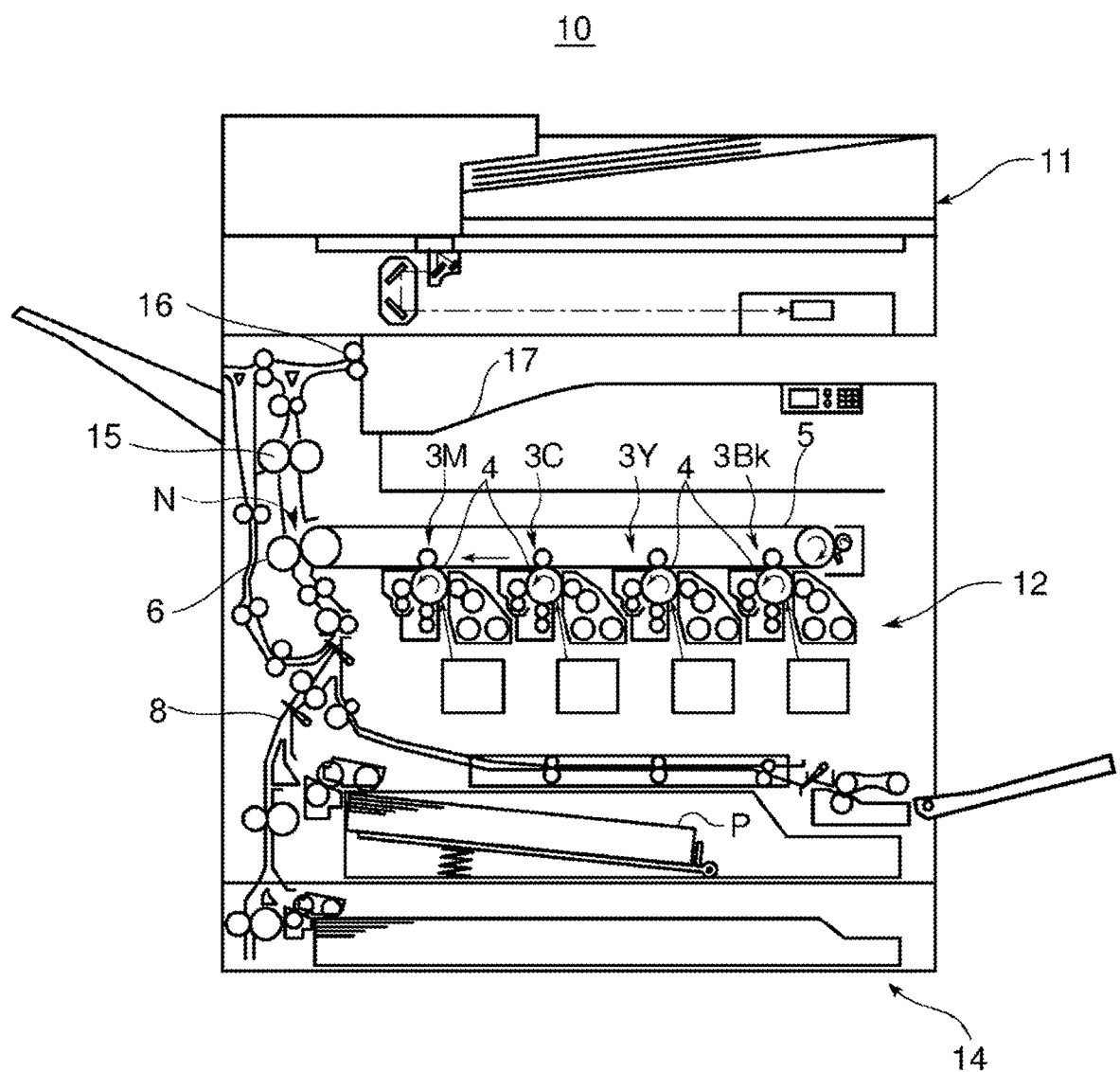
FIG. 1 obliquely illustrates an external appearance of an image forming apparatus according to a first embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes embodiments of the disclosure with reference to the drawings.

FIG. 1 illustrates a cross section of an image forming apparatus of a first embodiment of the disclosure. An image forming apparatus 10 of the first embodiment is a multifunctional peripheral (MFP) that has a combination of a plurality of functions, for example, a copy function, a printer function, and a scanner function. This image forming apparatus 10 includes an image reading unit 11 and an image forming unit 12.

The image reading unit 11 includes an imaging device that optically reads an image of an original document, and an analog output of this imaging device is converted into a digital signal to generate image data that indicates the image of the original document.

The image forming unit 12 prints the image indicated by the above-described image data or image data received from outside on a recording sheet, and includes an image forming subunit 3M for magenta, an image forming subunit 3C for cyan, an image forming subunit 3Y for yellow, and an image forming subunit 3Bk for black. In each of the image forming subunits 3M, 3C, 3Y, and 3Bk, a surface of a photoreceptor drum 4 is uniformly charged, the surface of the photoreceptor drum 4 is exposed, an electrostatic latent image is formed on the surface of the photoreceptor drum 4, the electrostatic latent image on the surface of the photoreceptor drum 4 is developed into a toner image, and the toner image on the surface of the photoreceptor drum 4 is primarily transferred on an intermediate transfer belt 5. This forms a color toner image on the intermediate transfer belt 5. This color toner image is secondarily transferred on a recording sheet P, which is conveyed from a paper sheet feeder 14 passing through a conveyance path 8, in a nip area N between the intermediate transfer belt 5 and a secondary transfer roller 6.

After this, the recording sheet P is heated and pressurized by a fixing unit 15, the toner image on the recording sheet P is fixed by fusing, and further, the recording sheet P is discharged to a discharge tray 17 passing through a discharge roller 16.

Figure 2:
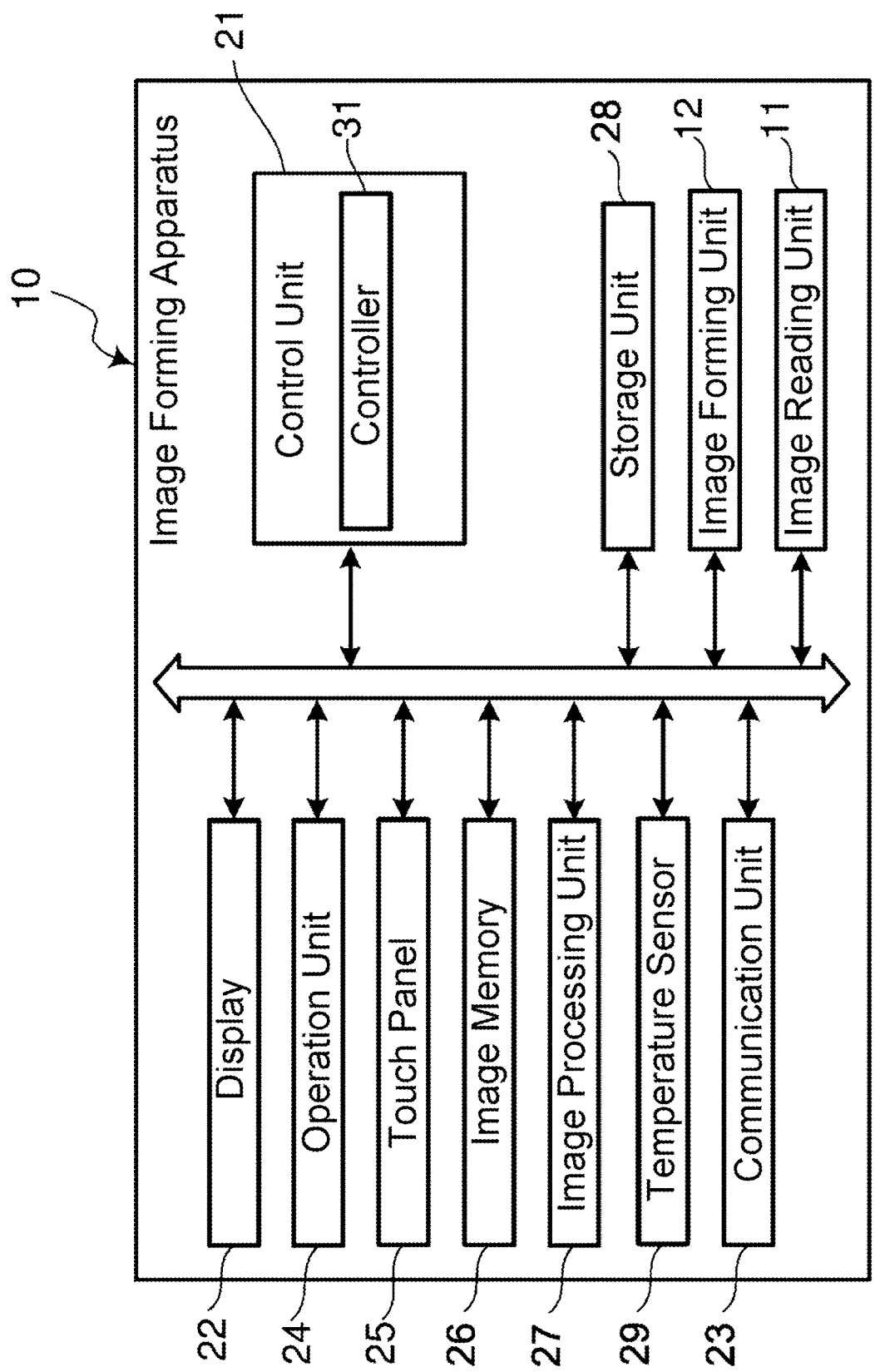
FIG. 2 illustrates a function block diagram of a main internal configuration of the image forming apparatus of the first embodiment.

Next, a configuration of a control by the image forming apparatus 10 will be described. FIG. 2 illustrates a function block diagram of a main internal configuration of the image forming apparatus 10. As illustrated in FIG. 2, the image forming apparatus 10 includes, for example, a control unit 21, a display 22, a communication unit 23, an operation unit 24, a touch panel 25, an image memory 26, an image processing unit 27, a storage unit 28, a temperature sensor 29, the image reading unit 11, and the image forming unit 12. These components are configured to mutually transmit and receive data or a signal via a bus.

The display 22 includes, for example, a liquid crystal display (LCD) or an Organic Light-Emitting Diode (OLED) display.

The communication unit 23 is a communication interface that includes a communication module, and performs data communications with an external terminal device (not illustrated). The external terminal device includes, for example, a personal computer (PC), a server, a tablet, and a smart phone. A communication method includes, for example, a communication method using a wired or a wireless LAN and Bluetooth (registered trademark).

The operation unit 24 includes hardware keys including, for example, a numeric keypad, a selection key, and a start key.

The display 22 has a screen on which the touch panel 25 is superimposed. The touch panel 25 is a touch panel of, what is called, a resistance film method and a capacitive type method, and detects a contact (touch) of, for example, a finger of a user on the touch panel 25 with its contact position, thus receiving an instruction of the user to, for example, a GUI on the screen of the display 22. Therefore, the touch panel 25 functions as an operation unit to which the user's operation to the screen of the display 22 is input.

The image memory 26 temporarily stores the image data read by the image reading unit 11 indicating the image of the original document and the image data received from the outside.

The image processing unit 27 performs various image processing such as a shading correction on the image data in the image memory 26.

The storage unit 28 includes, for example, a Random Access Memory (RAM) and a Hard Disk Drive (HDD) with a large capacity, and stores various kinds of data and programs.

The temperature sensor 29 is a known sensor that detects an environmental temperature (air temperature) in a vicinity of the image forming apparatus 10.

The control unit 21 includes, for example, a processor, a RAM, and a Read Only Memory (ROM). The processor is, for example, a Central Processing Unit (CPU), a Micro Processing Unit (MPU), or an Application Specific Processor (ASIC). The control program stored in the above-described ROM or the storage unit 28 is executed by the above-described processor, thus causing this control unit 21 to function as a controller 31. The controller 31 may be configured with a hardware circuit not a behavior based on the control program.

The controller 31 functions as a processing unit that executes various kinds of processes. The controller 31 controls the display 22 to display, for example, various kinds of setting screens and information. The controller 31 controls communication behaviors of the communication unit 23.

In thus configured image forming apparatus 10, the controller 31 causes the image memory 26 to store the image data, causes the image processing unit 27 to perform the various processes on the image data in the image memory 26, and subsequently, causes the image forming unit 12 to record the image indicated by the image data in the image memory 26 on the recording sheet P.

In forming a color image, the user can instruct a preliminarily set process of an environmental temperature mode. When the process of the environmental temperature mode is instructed, the controller 31 causes the image processing unit 27 to perform this process of the environmental temperature mode on the image data indicating the color image in the image memory 26. This process of the environmental temperature mode is a process performed on the image data indicating the color image in the image memory 26 based on an environmental temperature T detected by the temperature sensor 29. For example, a color temperature as a white reference (reference of white) is changed corresponding to the environmental temperature T, thus adjusting a white balance of the color image.

Figure 3:
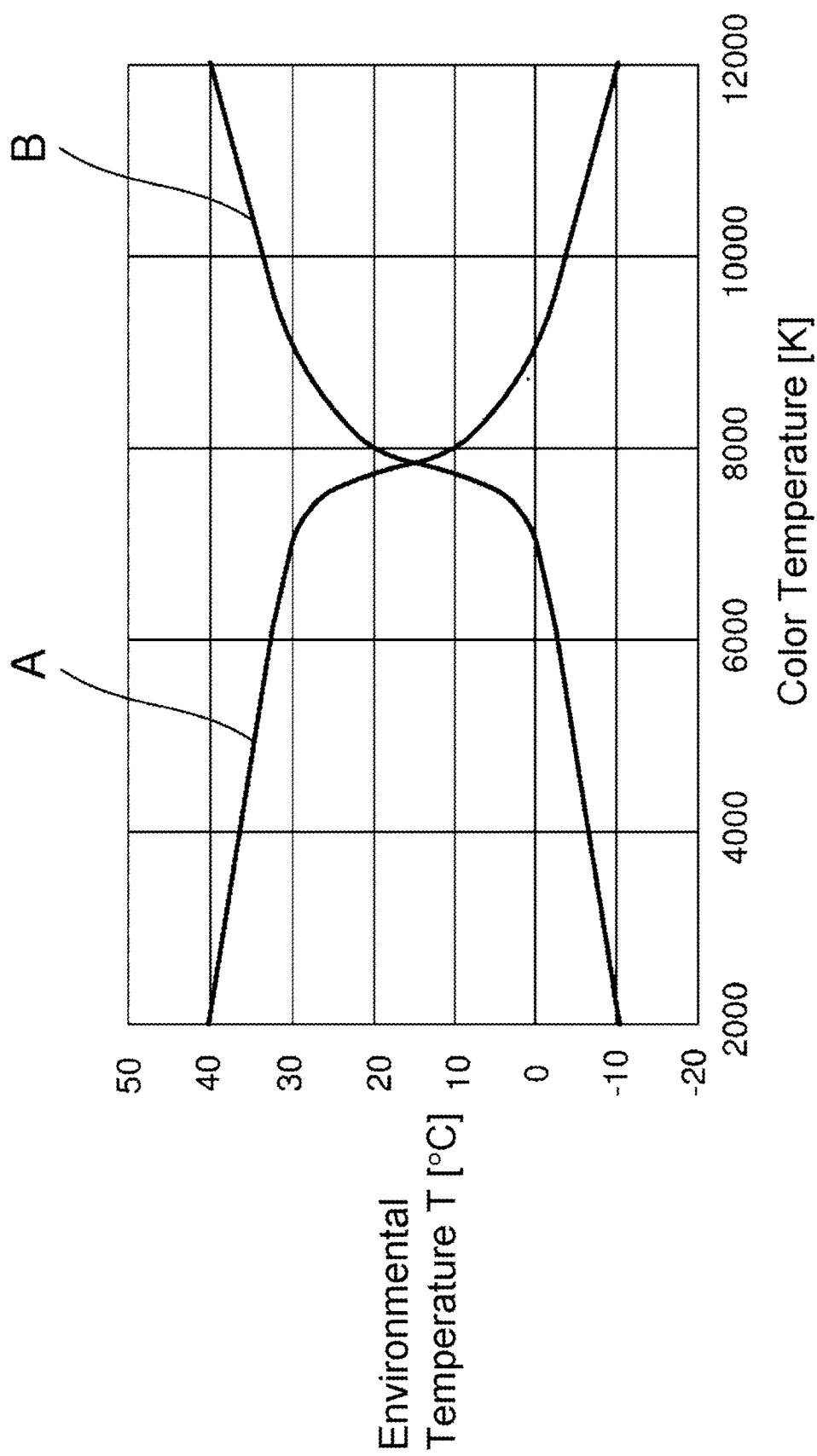
FIG. 3 illustrates a characteristic of a change in color temperature as a white reference that changes corresponding to an environmental temperature of the image forming apparatus of the first embodiment.

Further, as the process of the environmental temperature mode, the user can select and instruct any of two types of process corresponding to two characteristic curves A and B in a graph illustrated in FIG. 3.

FIG. 3 is a graph plotting profiles of variation in the color temperature that is a reference white which varies according to environmental temperature T. In FIG. 3, the vertical axis indicates environmental temperature T, the horizontal axis indicates color temperature K, and the two profile curves A and B indicate variation in the color temperature that is a accorded with the environmental temperature T.

The profile curve A indicates reference-white (color-temperature) variation that is the color temperature K becoming higher as the environmental temperature T becomes lower. Therein, when a process to that raises the color temperature K that is a reference white is carried out on a color image, a warm- impression (warm-color series) color image is produced; likewise, when a process that lowers the color temperature K that is a reference white is carried out on a color image, a cold-impression (cold-color series) color image is produced. Accordingly, based on the profile curve A, finding a color temperature K that corresponds to the environmental temperature T and carrying out on a color image a process which has that color temperature K be a reference white will produce a color image of warmer impression the more the environmental temperature T is low, and will produce a color image of cooler impression the more the environmental temperature T is high.

Meanwhile, the profile curve B, conversely with respect to the profile curve A, indicates reference-white (color-temperature) variation that is the color temperature K becoming lower as the environmental temperature T becomes lower. Accordingly, based on the characteristic curve B, finding a color temperature K that corresponds to the environmental temperature T and carrying out on a color image a process whereby that color temperature K is a reference white will produce a color image of cooler impression the more the environmental temperature T is low, and will produce a color image of warmer impression the more the environmental temperature T is high.

Respective correlations between environmental temperature T and color temperature K expressed by the profile curves A and B are advance-stored in the storage unit 28. Therein, with a color image being represented by R (red), G (green), and B (blue) image data, the image processing unit 27, carrying out on the image data a process in which the color temperature K is made the reference white, refers to the environmental-temperature T color-temperature K correlation expressed by the profile curve A or B in the storage unit 28 to find the color temperature K that corresponds to the environmental temperature T detected by the temperature sensor 29 and corrects the R pixel value, the G pixel value, and the B pixel value for every pixel in the color image expressed by the R, G, and B image data within the image memory 26.

Then, the image processing unit 27 converts the image data of R, G, and B into the image data of magenta, cyan, yellow, and black. The image forming subunits 3M, 3C, 3Y, and 3Bk of the image forming unit 12 form a magenta image, a cyan image, a yellow image, and a black image, respectively, on the surfaces of the respective photoreceptor drums 4 based on the image data of magenta, cyan, yellow, and black. The image forming subunits 3M, 3C, 3Y, and 3Bk transfer the images of the respective colors on the intermediate transfer belt 5 to superimpose them, thus forming the color image. This color image has the white balance where the color temperature K is employed as the white reference.

Figure 4:
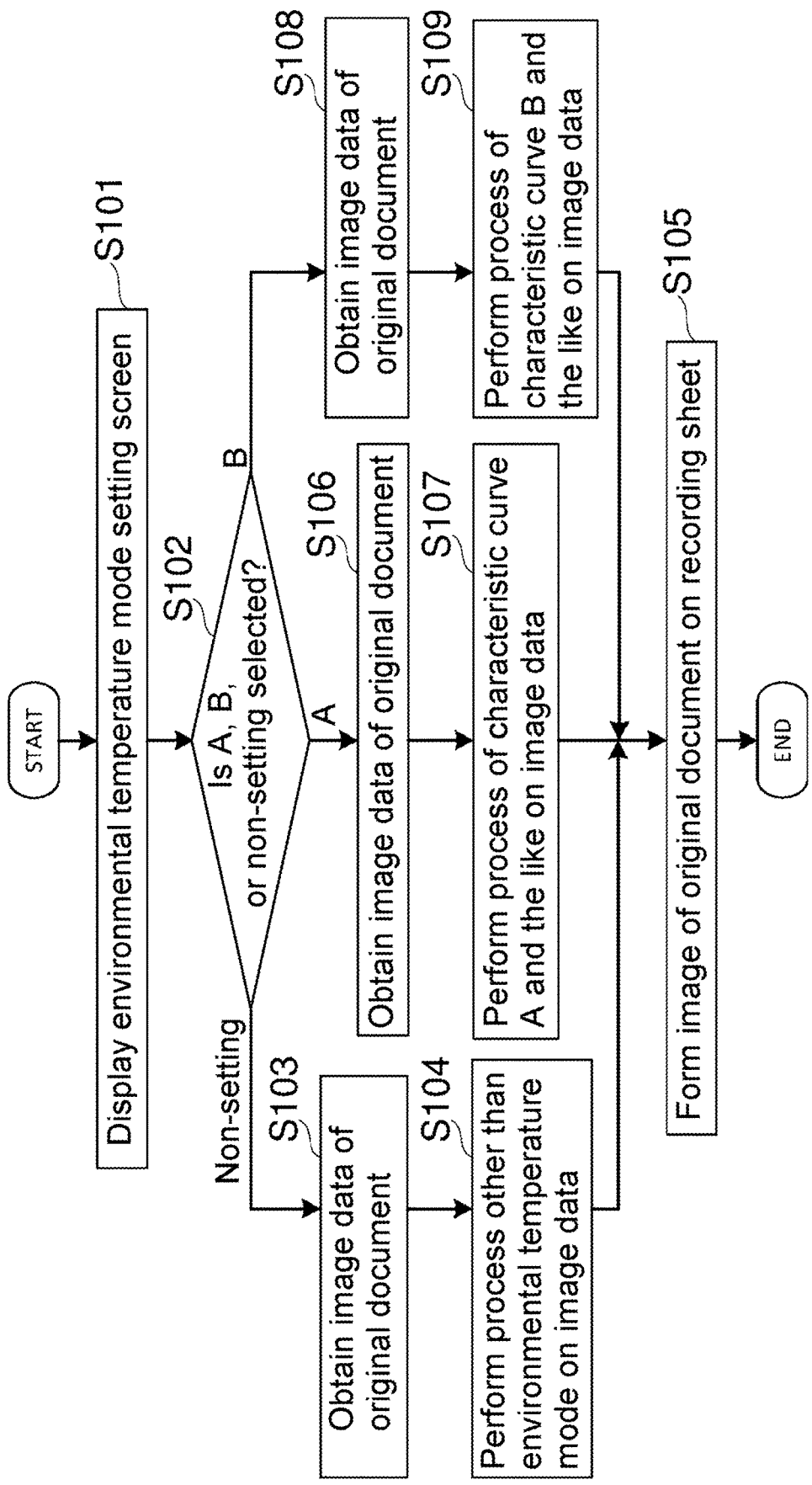
FIG. 4 illustrates a procedure in the image forming apparatus of the first embodiment.

Next, a description will be given of a procedure to instruct the above-described process of the environmental temperature mode and perform the process on the color image with reference to a flowchart illustrated in FIG. 4.

Figure 5:
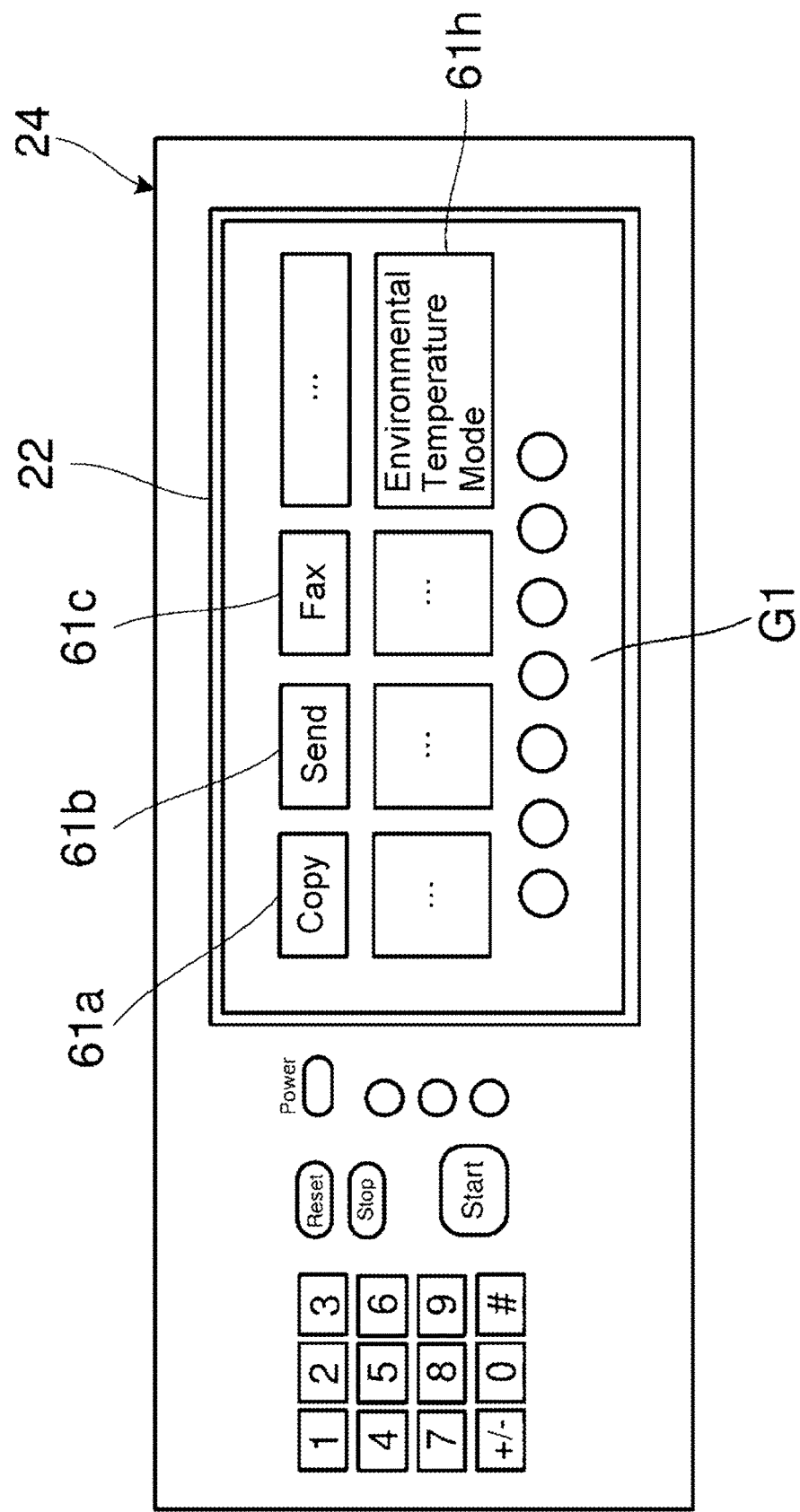
FIG. 5 illustrates an initial screen displayed on a display of the image forming apparatus of the first embodiment.
Figure 6:
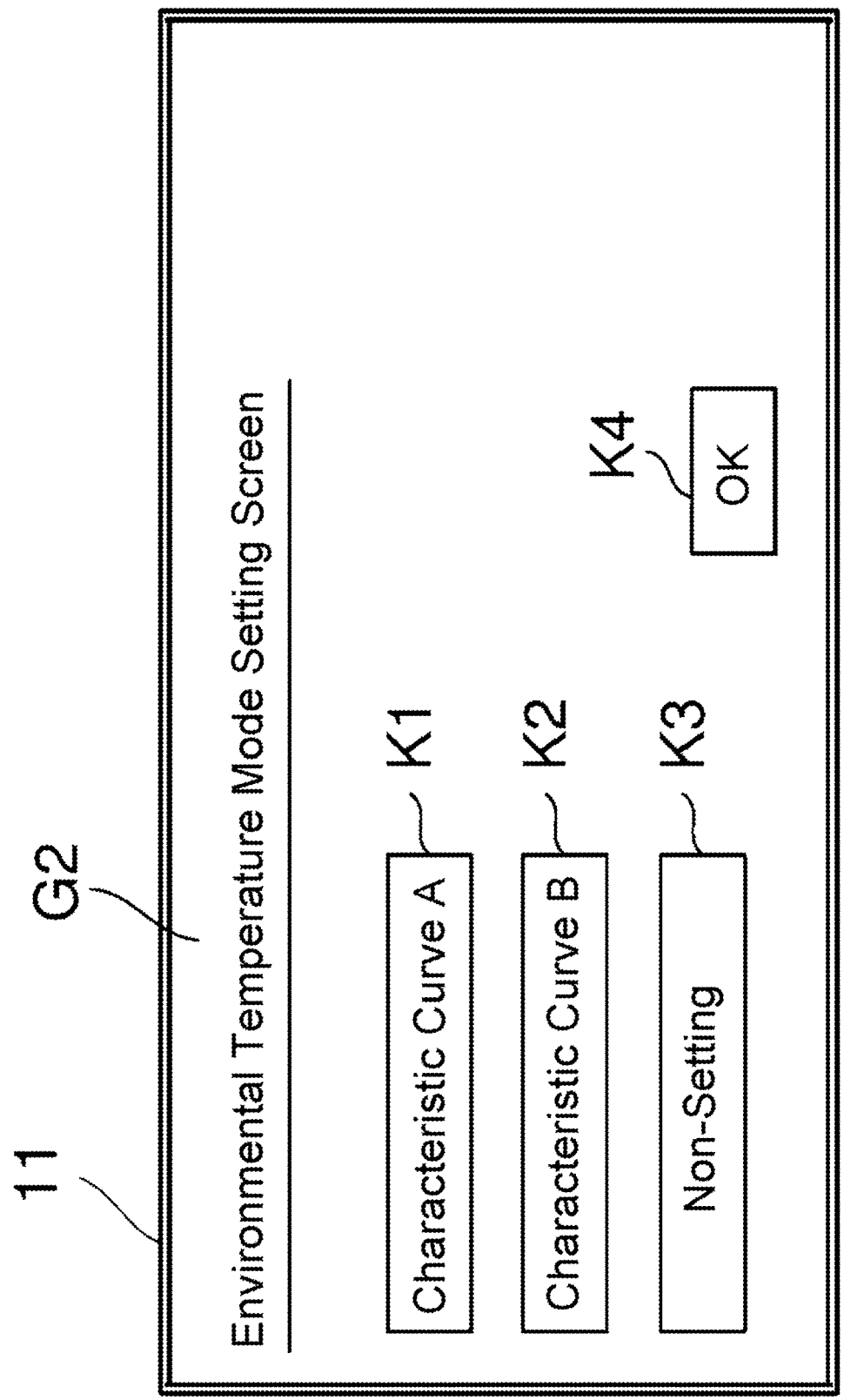
FIG. 6 illustrates an environmental temperature mode setting screen displayed on the display of the first embodiment.

First, assume that the controller 31 has caused the display 22 of the image forming apparatus 10 to display an initial screen G1 as illustrated in FIG. 5. This initial screen G1 displays, for example, a plurality of software keys 61a to 61h matched with the respective functions. At this time, when the user performs a touch operation to the software key 61h matched with the process of the environmental temperature mode, the controller 31 accepts the touch operation to the software key 61h via the touch panel 25, and causes the display 22 to display an environmental temperature mode setting screen G2 as illustrated in FIG. 6 on the screen (Step S101). This environmental temperature mode setting screen G2 displays a first key K1, a second key K2, a non-setting key K3, and an OK key K4. The first key K1 sets a process corresponding to the characteristic curve A of the graph illustrated in FIG. 3. The second key K2 sets a process corresponding to the characteristic curve B of the graph illustrated in, FIG. 3. The non-setting key K3 makes the process of the environmental temperature mode non-set or non-execution.

For example, when the user sequentially performs the touch operations to the non-setting key K3 and the OK key K4, the controller 31 accepts the touch operations to the non-setting key K3 and the OK key K4 via the touch panel 25, makes the process of the environmental temperature mode non-set (Step S102 "non-setting"), and the controller 31 causes the initial screen G1 to be displayed again.

Then, when the user sets the original document to the image reading unit 11 and operates the operation unit 24 or the touch panel 25 to instruct the execution of color copying, the controller 31 causes the image reading unit 11 to read the image of the original document and causes the image memory 26 to store the image data of R, G, and B indicating this image of the original document (Step S103).

The image processing unit 27 performs the process such as a shading correction on the image data of R, G, and B in the image memory 26, and performs general image processing to convert the image data of R, G, and B into the image data of magenta, cyan, yellow, and black. However, since the process of the environmental temperature mode is non-set at above-described Step S102, the image processing unit 27 does not perform the process of the environmental temperature mode on the image data of R, G, and B in the image memory 26 (Step S104). The image forming unit 12 receives the image data of magenta, cyan, yellow, and black in the image memory 26, forms the color image on the recording sheet P, and discharges this recording sheet P (Step S105).

Accordingly, when the process of the environmental temperature mode is non-set, the process of the environmental temperature mode is not performed on the color image data but the other ordinary process such as the shading correction is performed. The color image indicated by the image data on which this other ordinary process has been performed is formed on the recording sheet P.

Next, assume that the user sequentially performs the touch operations to the first key K1 and the OK key K4 on the environmental temperature mode setting screen G2. In this case, the controller 31 accepts the touch operations to the first key K1 and the OK key K4 via the touch panel 25, sets the process of the environmental temperature mode corresponding to the characteristic curve A in the graph illustrated in FIG. 3 (Step S102 "A"), and the controller 31 causes the initial screen G1 to be displayed again.

Then, when the user sets the original document to the image reading unit 11 and operates the operation unit 24 or the touch panel 25 to instruct the execution of color copying, the controller 31 causes the image reading unit 11 to read the image of the original document and causes the image memory 26 to store the image data of R, G, and B indicating this image of the original document (Step S106).

The image processing unit 27 performs the process such as the shading correction on the image data of R, G, and B in the image memory 26, and performs the general image processing to convert the image data of R, G, and B into the image data of magenta, cyan, yellow, and black. Since the process of the environmental temperature mode corresponding to the characteristic curve A has been set at above-described Step S102 before this conversion of the image data, the image processing unit 27 refers to the correspondence relationship between the environmental temperature T and the color temperature K indicated by the characteristic curve A in the storage unit 28 to obtain the color temperature K corresponding to the environmental temperature T detected by the temperature sensor 29, and further performs the process to employ this color temperature K as the white reference on the image data of R, G, and B in the image memory 26 (Step S107). At this time, the controller 31 causes the display 22 to perform a preview display of the color image after the process based on the image data of R, G, and B on which the process of the environmental temperature mode has been performed.

The image forming unit 12 receives the image data of magenta, cyan, yellow, and black in the image memory 26, forms the color image on the recording sheet P, and discharges this recording sheet P (Step S105).

Accordingly, when the process of the environmental temperature mode corresponding to the characteristic curve A is selected, the process to employ the color temperature K corresponding to the environmental temperature T indicated by the characteristic curve A as the white reference and the other ordinary process are performed on the color image data. The color image indicated by the image data on which these processes have been performed is formed on the recording sheet P. In this case, the color image has the warmer impression as the environmental temperature T decreases while the color image has the colder impression as the environmental temperature T increases.

Next, assume that the user sequentially performs the touch operations to the second key K2 and the OK key K4 on the environmental temperature mode setting screen G2. In this case, the controller 31 accepts the touch operations to the second key K2 and the OK key K4 via the touch panel 25, sets the process of the environmental temperature mode corresponding to the characteristic curve B in the graph illustrated in FIG. 3 (Step S102 "B"), and the controller 31 causes the initial screen G1 to be displayed again.

Then, when the user sets the original document to the image reading unit 11 and instructs the execution of color copying, the controller 31 causes the image reading unit 11 to read the image of the original document and causes the image memory 26 to store the image data of R, G, and B indicating this image of the original document (Step S108).

The image processing unit 27 performs the image processing such as the shading correction on the image data of R, G, and B in the image memory 26, and converts the image data of R, G, and B into the image data of magenta, cyan, yellow, and black. Since the process of the environmental temperature mode corresponding to the characteristic curve B has been set at above-described Step S102 before this conversion of the image data, the image processing unit 27 refers to the correspondence relationship between the environmental temperature T and the color temperature K indicated by the characteristic curve B in the storage unit 28 to obtain the color temperature K corresponding to the environmental temperature T detected by the temperature sensor 29, and performs the process to employ this color temperature K as the white reference on the image data of R, G, and B in the image memory 26 (Step S109). The controller 31 causes the display 22 to perform the preview display of the color image after the process based on the image data of R, G, and B on which the process of the environmental temperature mode has been performed.

The image forming unit 12 receives the image data of magenta, cyan, yellow, and black in the image memory 26, forms the color image on the recording sheet P, and discharges this recording sheet P (Step S105).

Accordingly, when the process of the environmental temperature mode corresponding to the characteristic curve B is selected, the process to employ the color temperature K corresponding to the environmental temperature T indicated by the characteristic curve B as the white reference and the other ordinary process are performed on the color image data. The color image indicated by the image data on which these processes have been performed is formed on the recording sheet P. In this case, the color image has the colder impression as the environmental temperature T decreases while the color image has the warmer impression as the environmental temperature T increases.

Thus, in the image forming apparatus 10 of the first embodiment, when the process of the environmental temperature mode corresponding to the characteristic curve A or B is selected, the impression of the color image formed on the recording sheet P changes in accordance with the environmental temperature T. For example, when the process of the environmental temperature mode corresponding to the characteristic curve A is selected, the color image has the warmer impression as the environmental temperature T decreases while the color image has the colder impression as the environmental temperature T increases, thus the effect to reduce the user's stress caused by the change in the environmental temperature T can be expected. When the process of the environmental temperature mode corresponding to the characteristic curve B is selected, the color image has the colder impression as the environmental temperature T decreases while the color image has the warmer impression as the environmental temperature T increases, thus the color image can be impressed to the user while the change in the environmental temperature T is amplified.

Accordingly, with the image forming apparatus 10 according to the first embodiment, variously changing an image representation by changing the image representation in accordance with the environmental temperature ensures an enhanced entertainment value.

While the environmental temperature T in the vicinity of the image forming apparatus 10 is detected by the temperature sensor 29 and used in the first embodiment, an environmental temperature (air temperature) transmitted from an external terminal device may be received by the communication unit 23 and used. Alternatively, temperature information from a network source may be received by the communication unit 23 and used. The user may operate the operation unit 24 and input the environmental temperature to use this environmental temperature.

While the process of the environmental temperature mode is exemplified with the process where the color temperature K corresponding to the environmental temperature T is obtained and this color temperature K is employed as the white reference on the image data indicating the color image, another process may be performed on the image data. For example, a process to add a background image whose color changes in accordance with the environmental temperature T on the image and a process to print a message that changes in accordance with the environmental temperature T on the image may be performed on the image data.

The image forming apparatus 10 according to the above-described embodiment is also one embodiment of a display apparatus in the disclosure in a point that the image forming apparatus 10 includes the display 22, and the controller 31 causes the display 22 to perform the preview display of the color image after the process based on the image data of R, G, and B on which the process of the environmental temperature mode has been performed. One embodiment of a display apparatus other than the image forming apparatus 10 will be described below.

Figure 7:
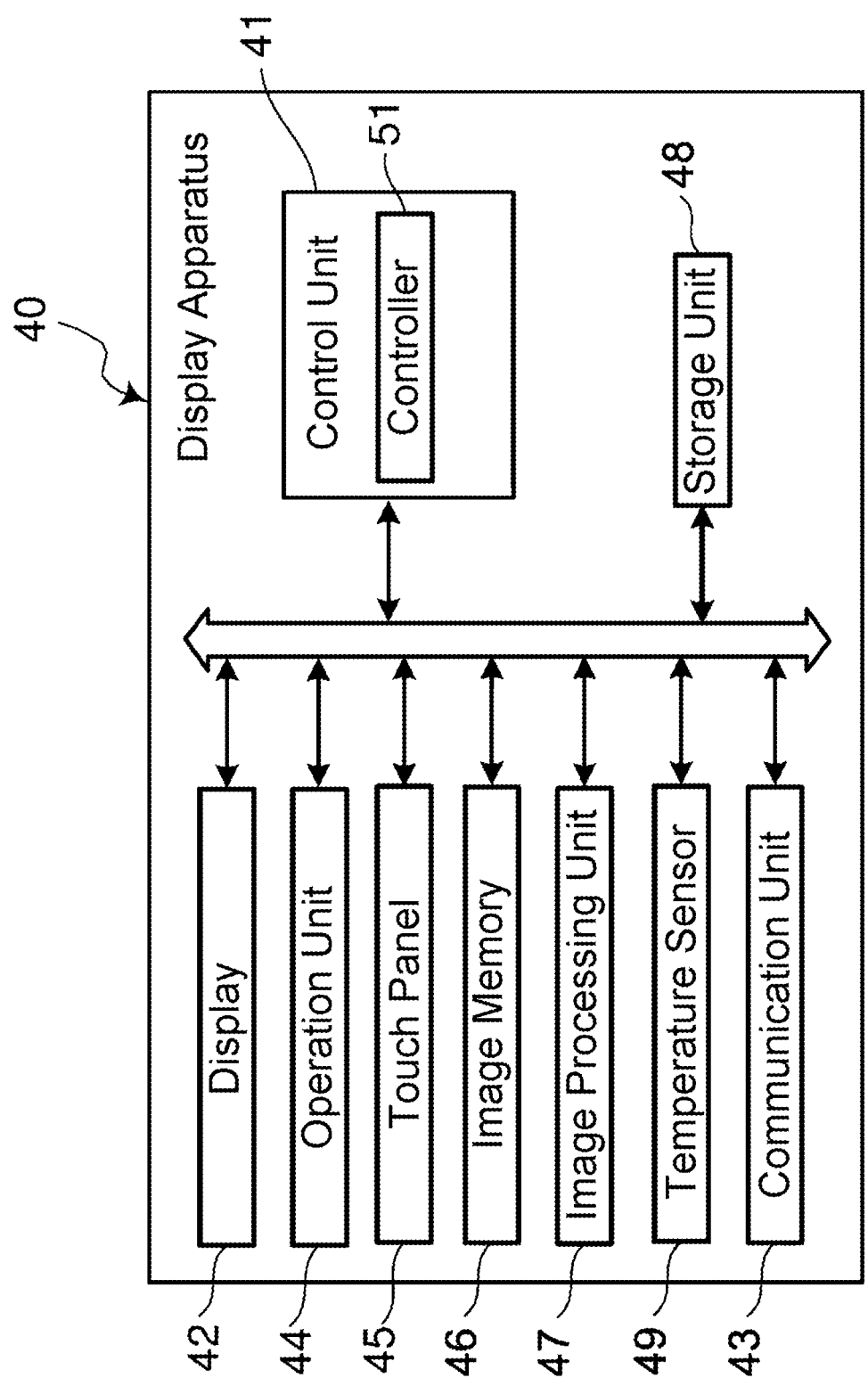
FIG. 7 illustrates a function block diagram of a main internal configuration of a display apparatus according to a second embodiment of the disclosure.

FIG. 7 illustrates a block diagram of a configuration of a display apparatus according to a second embodiment of the disclosure. A display apparatus 40 of the second embodiment is, for example, a personal computer (PC), a tablet, and a smart phone, and includes a control unit 41, a display 42, a communication unit 43, an operation unit 44, an image memory 46, an image processing unit 47, a storage unit 48, and a temperature sensor 49, for example. These components are configured to mutually transmit and receive data or a signal via a bus. In the following description, the configurations and the processes not specifically described are similar or similarly performed to the first embodiment.

The display 42 includes, for example, a liquid crystal display or an organic EL display.

The communication unit 43 is a communication interface that includes a communication module, and performs data communications with an external terminal device (not illustrated).

The operation unit 44 is a keyboard and a pointing device.

The image memory 46 temporarily stores image data indicating a still image or a moving image displayed on the display 42.

The image processing unit 47 performs image processing on the image data in the image memory 46.

The storage unit 48 includes, for example, a RAM, a ROM, and a HDD with a large capacity, and stores various kinds of data and programs.

The temperature sensor 49 is a known sensor that detects an environmental temperature (air temperature) in a vicinity of the display apparatus 40.

The control unit 41 includes, for example, a processor, a RAM, and a ROM. The control program stored in the above-described ROM or the storage unit 48 is executed by the above-described processor, thus causing this control unit 41 to function as a controller 51. The above-described controller 51 of the control unit 41 may be configured with a hardware circuit not a behavior based on the control program.

The controller 51 functions as a processing unit that executes various kinds of processes. The controller 51 controls the display 42 to display, for example, various kinds of setting screens and information. The controller 51 controls communication behaviors of the communication unit 43.

In thus configured display apparatus 40, when the color image (still image or moving image) is to be displayed on the display 42, the controller 51 causes the image memory 46 to store the image data of R, G, and B indicating the color image and causes the image processing unit 47 to perform the above-described process of the environmental temperature mode on the image data of R, G, and B in the image memory 46, thus the controller 51 can cause the display 42 to display the color image indicated by the image data of R, G, and B in the image memory 46.

The process of the environmental temperature mode includes the process based on the characteristic curve A and the process based on the characteristic curve B, which are illustrated in FIG. 3, and the correspondence relationships between the environmental temperature T and the color temperature K indicated by the respective characteristic curves A and B are preliminarily stored in the storage unit 48. The image processing unit 47 refers to the correspondence relationship between the environmental temperature T and the color temperature K indicated by the characteristic curve A or B in the storage unit 48 to obtain the color temperature K corresponding to the environmental temperature T detected by the temperature sensor 49, the image processing unit 47 corrects a value of a pixel of R, a value of a pixel of G, and a value of a pixel of B for each pixel of the color image indicated by the image data of R, G, and B in the image memory 46, and the image processing unit 47 performs the process to employ the color temperature K as the white reference on this image data.

Here, when the user operates the operation unit 44 to instruct the process of the environmental temperature mode, the controller 51 accepts the instruction, and the controller 51 causes the display 42 to display the environmental temperature mode setting screen G2 as illustrated in FIG. 6 on the screen. In this state, the user can selectively instruct the first key K1, the second key K2, the non-setting key K3, and the OK key K4 on the environmental temperature mode setting screen G2.

For example, when the user sequentially instructs the non-setting key K3 and the OK key K4, the controller 51 accepts the instructions to the non-setting key K3 and the OK key K4, and makes the process of the environmental temperature mode non-set. In this case, the image processing unit 47 does not perform the process of the environmental temperature mode on the image data of R, G, and B in the image memory 46. The controller 51 causes the display 42 to display the color image indicated by the image data of R, G, and B in the image memory 46.

Accordingly, when the process of the environmental temperature mode is non-set, the process of the environmental temperature mode is not performed on the image data of R, G, and B, and an ordinary color image is displayed on the display 42.

When the user sequentially instructs the first key K1 and the OK key K4, the controller 51 accepts the instructions to the first key K1 and the OK key K4, and sets the process of the environmental temperature mode corresponding to the characteristic curve A. In this case, the image processing unit 47 refers to the correspondence relationship between the environmental temperature T and the color temperature K indicated by the characteristic curve A in the storage unit 48 to obtain the color temperature K corresponding to the environmental temperature T detected by the temperature sensor 49, and performs the process to employ this color temperature K as the white reference on the image data of R, G, and B in the image memory 46. The controller 51 causes the display 42 to display the color image indicated by the image data of R, G, and B in the image memory 46.

Accordingly, when the process of the environmental temperature mode corresponding to the characteristic curve A is selected, the process to employ the color temperature K corresponding to the environmental temperature T indicated by the characteristic curve A as the white reference is performed on the image data of R, G, and B. Therefore, the color image has the warmer impression as the environmental temperature T decreases while the color image has the colder impression as the environmental temperature T increases.

When the user sequentially instructs the second key K2 and the OK key K4, the controller 51 accepts the instructions to the second key K2 and the OK key K4, and sets the process of the environmental temperature mode corresponding to the characteristic curve B. In this case, the image processing unit 47 refers to the correspondence relationship between the environmental temperature T and the color temperature K indicated by the characteristic curve B in the storage unit 48 to obtain the color temperature K corresponding to the environmental temperature T detected by the temperature sensor 49, and performs the process to employ this color temperature K as the white reference on the image data of R, G, and B in the image memory 46. The controller 51 causes the display 42 to display the color image indicated by the image data of R, G, and B in the image memory 46.

Accordingly, when the process of the environmental temperature mode corresponding to the characteristic curve B is selected, the process to employ the color temperature K corresponding to the environmental temperature T indicated by the characteristic curve B as the white reference is performed on the image data. Therefore, the color image has the colder impression as the environmental temperature T decreases while the color image has the warmer impression as the environmental temperature T increases.

Even in such a display apparatus 40 of the second embodiment, since the impression of the color image changes in accordance with the environmental temperature T, the user's stress caused by the change in the environmental temperature T can be reduced, and the color image can be impressed to the user while the change in the environmental temperature T is amplified.

Similarly to the first embodiment, in the second embodiment, in addition to the use of the environmental temperature T detected by the temperature sensor 49, an environmental temperature (air temperature) transmitted from an external terminal device may be received by the communication unit 43 and used, temperature information from a network source may be received by the communication unit 43 and used, and an environmental temperature input via the operation on the operation unit 44 may be used.

As the process of the environmental temperature mode, another process may be performed on the image data. For example, a process to add a background image whose color changes in accordance with the environmental temperature T on the image and a process to print a message that changes in accordance with the environmental temperature T on the image may be performed on the image data.

Exemplary Embodiment of the Disclosure

The image forming apparatus according to one aspect of the disclosure includes an image forming unit, a temperature input unit, and an image processing unit. The image forming unit forms an image on a recording sheet. The temperature input unit receives an input of an environmental temperature. The image processing unit performs a preliminarily set process that changes in accordance with the environmental temperature on the image based on the input environmental temperature.

The display apparatus according to one aspect of the disclosure includes a display, a temperature input unit, and an image processing unit. The display displays an image. The temperature input unit receives an input of an environmental temperature. The image processing unit performs a preliminarily set process that changes in accordance with the environmental temperature on the image based on the input environmental temperature.

Effect of the Disclosure

With the disclosure, variously changing an image representation by changing the image representation in accordance with the environmental temperature ensures an enhanced entertainment value.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image forming apparatus comprising:
an image forming unit for forming a color image on a recording sheet;
a temperature input unit for receiving input of an environmental temperature;
an image processing unit for performing on the color image, based on the input environmental temperature, a white-balance process that in accordance with the environmental temperature changes that color temperature of the color image which is the color image's reference white;
a storage unit storing a correlation between environmental temperature and color temperature plotted in a profile curve A defined by the color temperature that is the reference white becoming higher according as the environmental temperature becomes lower, and a correlation between environmental temperature and color temperature plotted in a profile curve B defined by the color temperature that is the reference white becoming lower according as the environmental temperature becomes lower;
a user operation unit for user instructing of image-forming operations by the image forming apparatus; and
an image-forming apparatus controller constituted by processing circuitry and being operatively connected to the image forming unit, the temperature input unit, the image processing unit, the storage unit, and the user operation unit, the image-forming apparatus controller configured to
cause the user operation unit to accept selection of, and to instruct the image-forming apparatus controller to execute, either an A-profile white-balance process corresponding to the profile curve A, or a B-profile white-balance process corresponding to the profile curve B;
when instructed to execute the A-profile white-balance process, cause the image processing unit to refer to the environmental-temperature—color-temperature correlation expressed by the profile curve A stored in the storage unit and find the A-profile color temperature that corresponds to the environmental temperature received through the temperature input unit, and to carry out on the color image an A-profile white-balance process that has the A-profile color temperature be the reference white, and
when instructed to execute the B-profile white-balance process, cause the image processing unit to refer to the environmental-temperature—color-temperature correlation expressed by the profile curve B stored in the storage unit and find the B-profile color temperature that corresponds to the environmental temperature received through the temperature input unit, and to carry out on the color image a B-profile white-balance process that has the B-profile color temperature be the reference white; and
cause the image forming unit to form either the A-profile white-balanced color image or the B-profile white-balanced color image on a recording sheet.

2. The image forming apparatus according to claim 1, wherein the temperature input unit is at least one of a temperature sensor, a communication unit, and an operation unit, the temperature sensor detects the environmental temperature, the communication unit receives the environmental temperature transmitted from an external terminal device, or the operation unit is operated by a user to input the environmental temperature.

3. A display apparatus comprising:
a display for displaying a color image;
a temperature input unit for receiving input of an environmental temperature;
an image processing unit for performing on the color image, based on the input environmental temperature, a white-balance process that in accordance with the environmental temperature changes that color temperature of the color image which is the color image's reference white;
a storage unit storing a correlation between environmental temperature and color temperature plotted in a profile curve A defined by the color temperature that is the reference white becoming higher according as the environmental temperature becomes lower, and a correlation between environmental temperature and color temperature plotted in a profile curve B defined by the color temperature that is the reference white becoming lower according as the environmental temperature becomes lower;
a user operation unit for user instructing of display operations by the display apparatus; and
a display apparatus controller constituted by processing circuitry and being operatively connected to the temperature input unit, the image processing unit, the storage unit, and the user operation unit, the display apparatus controller configured to cause the user operation unit to accept selection of, and to instruct the image-forming apparatus controller to execute, either an A-profile white-balance process corresponding to the profile curve A, or a B-profile white-balance process corresponding to the profile curve B;

when instructed to execute the A-profile white-balance process, cause the image processing unit to refer to the environmental-temperature—color-temperature correlation expressed by the profile curve A stored in the storage unit and find the A-profile color temperature that corresponds to the environmental temperature received through the temperature input unit, and to carry out on the color image an A-profile white-balance process that has the A-profile color temperature be the reference white, and when instructed to execute the B-profile white-balance process, cause the image processing unit to refer to the environmental-temperature—color-temperature correlation expressed by the profile curve B stored in the storage unit and find the B-profile color temperature that corresponds to the environmental temperature received through the temperature input unit, and to carry out on the color image a B-profile white-balance process that has the B-profile color temperature be the reference white; and cause the display to preview-display either the A-profile white-balanced color image or the B-profile white-balanced color image.

4. The display apparatus according to claim 3, wherein the temperature input unit is at least one of a temperature sensor, a communication unit, and an operation unit, the temperature sensor detects the environmental temperature, the communication unit receives the environmental temperature transmitted from an external terminal device, or the operation unit is operated by a user to input the environmental temperature.

* * * * *